United States Patent

Kanezaki et al.

Patent Number: 5,282,688
Date of Patent: Feb. 1, 1994

[54] SINTERED OIL IMPREGNATED BEARING AND ITS MANUFACTURING METHOD

[75] Inventors: Noboru Kanezaki, Niigata; Takeshi Tanaka; Yoshiaki Hayashi, both of Kosai, all of Japan

[73] Assignees: Mitsubishi Materials Corporation, Tokyo; Asmo Co., Ltd., Kosai, both of Japan

[21] Appl. No.: 941,808

[22] Filed: Sep. 8, 1992

[51] Int. Cl.$^5$ .................. F16C 33/02; B21D 53/10
[52] U.S. Cl. ..................... 384/279; 29/898.054
[58] Field of Search .................. 384/279, 902; 29/898.054, 898.057

[56] References Cited

U.S. PATENT DOCUMENTS

| | | | |
|---|---|---|---|
| 2,894,792 | 7/1959 | Brilli | 384/279 |
| 3,445,148 | 5/1969 | Harris et al. | 384/279 |
| 5,120,140 | 6/1992 | Nakagawa et al. | 384/279 |
| 5,129,738 | 7/1992 | Nakagawa | 384/279 |

*Primary Examiner*—Thomas R. Hannon
*Attorney, Agent, or Firm*—Oblon, Spivak, McClelland, Maier & Neustadt

[57] ABSTRACT

In a sintered oil impregnated bearing constructed of a bearing main body made of a porous type sintered alloy on which is formed a bearing hole for inserting a rotating shaft therethrough, the pores on the axially lying sliding face of the inner peripheral surface of the bearing hole on which the rotating shaft slides are crushed. The sintered oil impregnated bearing is manufactured, at the time of forming powder compact, by forming a through hole defining the bearing hole, by a rod having a roughening section formed thereon, thereby crushing the pores which are in contact with the roughening section, and afterward by sintering the powder compact. Because the pores on the sliding face are crushed, the lubricating oil on the sliding face does not leak, thereby forming a strong oil film having no oil pressure drop on the sliding face, and thus preventing the local contact between the rotating shaft and the sliding face. It is therefor is possible to lower the coefficient of friction of the bearing.

2 Claims, 2 Drawing Sheets

SINTERED OIL IMPREGNATED BEARING AND ITS MANUFACTURING METHOD

BACKGROUND OF THE INVENTION

This invention relates to a sintered oil impregnated bearing and its manufacturing method, especially, a sintered oil impregnated bearing having superior frictional characteristics, and its manufacturing method.

Formed from a porous-type sintered alloy, and after being impregnated with oil, such sintered oil impregnated bearings can be used for extended periods of time without lubrication, therefore, they are widely used as bearings for rotating shafts of various machines.

This type of sintered oil impregnated bearing is constructed, as illustrated in FIG. 6, which shows a bearing hole 2 formed in a bearing main body 1 made of a porous-type sintered alloy, a rotating shaft of a smaller diameter than the hole 2 is inserted in the hole, and the lubricating oil drawn off from a large number of oil-containing holes (pores) in the bearing main body 1 due to the pumping action caused by the rotation of the rotating shaft 3, and the lubricating oil seeping out due to expansion caused by frictional heat form an oil film on the sliding face 4 of the bearing hole 2, thereby freely rotatably supporting the rotating shaft 3.

However, in the above noted sintered oil impregnated bearing, because there are a large number of pores formed on the sliding face 4 of the bearing hole 2 on which the rotating shaft 3 is sliding, even if the oil film is generated, a part of the lubricating oil leaks from the above noted pores causing a drop in the oil pressure, and as a result, local touching of the rotating shaft 3 with the sliding face 4 takes place. When such local touching occurs, the coefficient of friction of the oil impregnated bearing becomes large, and burning is easy to be generated, and this was a fault. Therefore, the present inventors considered that if the lubricating oil can be made not to leak out from the sliding face 4, a strong oil film without having an oil pressure drop can be formed, thus enabling the lowering of the coefficient of friction of the bearing.

SUMMARY OF THE INVENTION

This invention was made in view of the above noted acknowledgement, and an objective is to provide a sintered oil impregnated bearing which is capable of lowering the coefficient of friction by preventing the leaking of lubricating oil from the sliding face, and its manufacturing method.

To achieve the above-stated objective, the sintered oil impregnated bearing of this invention is constructed such that, in an oil impregnated bearing which includes a bearing main body made of a porous type sintered alloy on which is formed a bearing hole into which a shaft is inserted, the pores, on the axially lying sliding face of the inner peripheral surface of the bearing hole upon which face the above noted rotating shaft slides, are crushed at the time of powder compact shaping for the above noted bearing main body.

The manufacturing method for the sintered oil impregnated bearing is characterized in that, at the time of making a sintered oil impregnated bearing including a bearing main body made of a porous type sintered alloy and having a bearing hole formed thereon, through which a rotating shaft is inserted, at the time of making a powder compact before sintering, by forming a through hole which would become the above noted bearing hole by means of a rod including a roughening section formed on a part of the external peripheral surface along the axial direction and having higher roughness than other parts, the pores on the inside surface of the through hole touching the roughening section are crushed, after which, powder compact is sintered.

In the sintered oil impregnated bearing of this invention, because the pores on the axially lying sliding face of the inner peripheral surface of the bearing hole upon which face the rotating shaft slides, are crushed, no leaking of the lubricating oil on the sliding face occurs, and the oil pressure does not drop, and a strong oil film is formed. Also the sliding face and the rotating shaft are supplied with sufficient lubricating oil from the pores on the inside surface excepting from the sliding face. Therefore, the rotating shaft and the sliding face do not touch locally, and the coefficient of friction of the impregnated bearing can be made small. It therefore becomes possible to obtain bearing characteristics having high application limits.

Further, because the pores on the above noted sliding face are crushed during the forming of the powder compact for the bearing main body, plastic deformation of the sliding face is carried out smoothly, and crushing of the above noted pores is carried out reliably.

In the manufacturing method of the sintered oil impregnated bearing, at the time of forming the powder compact, those parts which make contact with the roughening section are compressed by the roughening section formed on the rod, and plastically flowed toward the inside of the pores on the inside surface of the through hole so that the pores are crushed. By sintering the powder compact having the pores crushed, a sintered oil impregnated bearing is manufactured whose pores on the sliding face of the bearing hole are crushed.

DESCRIPTION OF THE PREFERRED EMBODIMENTS OF THE INVENTION

Figure 1:
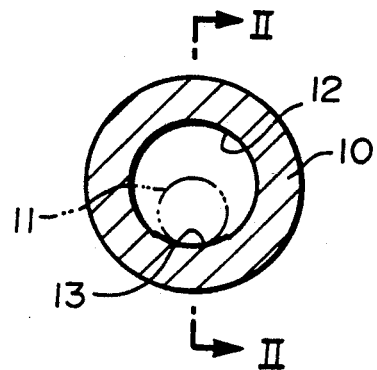
FIG. 1 is a cross section of a sintered, oil impregnated bearing in one embodiment of this invention.
Figure 2:
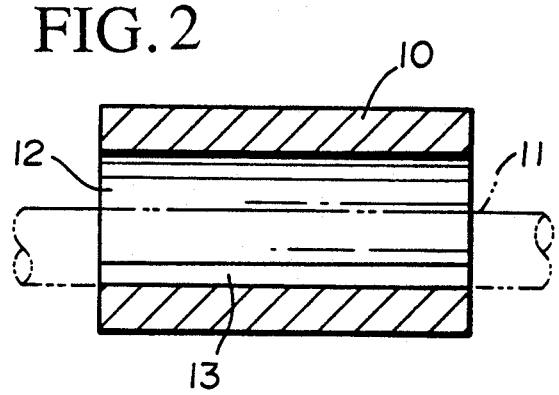
FIG. 2 is a cross section taken along the line II—II in FIG. 1.

One embodiment of the sintered oil impregnated bearing of this invention and its manufacturing method are explained. The sintered oil impregnated bearing shown in FIG. 1 and FIG. 2 is constructed so that on a bearing main body 10 made of a porous type sintered alloy, a bearing hole 12 is formed into which a rotating shaft 11 is inserted, and the pores, on the axially lying sliding face 13 of the inner peripheral surface of the bearing hole 12 upon which face the above noted rotating shaft 11 slides, are crushed during the forming of powder compact of the above noted bearing main body 10, thereby preventing leaking of the lubricating oil therefrom.

Figure 3:
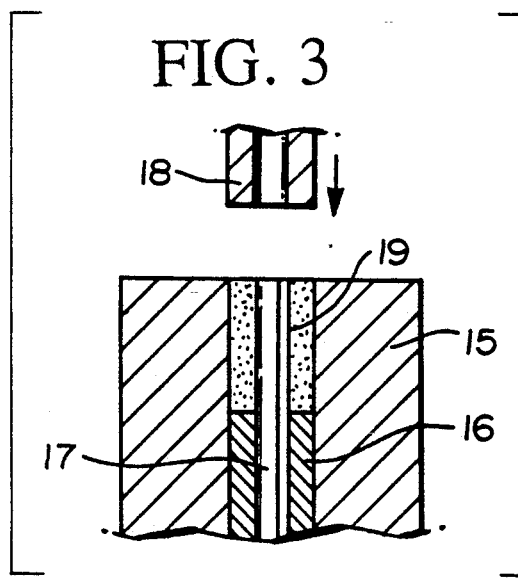
FIG. 3 is a cross section of critical parts of the die set for practicing a manufacturing method in one embodiment of the invention.

Next, a manufacturing method for the above noted sintered oil impregnated bearing is explained. First, as shown in FIG. 3, a cylindrical lower punch 16 is placed at a predetermined position in a die 15 of a die set which is used for usual powder molding, and a cylindrical core rod 17 is placed flush with the top surface of the die 15. At this stage, an upper punch 18 is made to stand by above the die 15.

Figure 4:
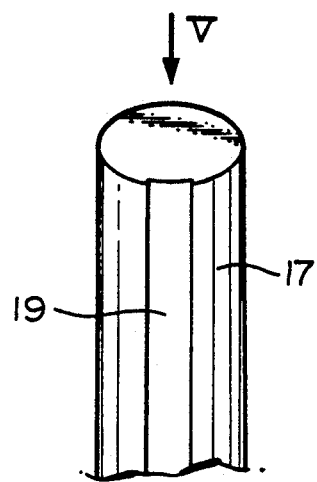
FIG. 4 is a perspective view of a core rod.
Figure 5:
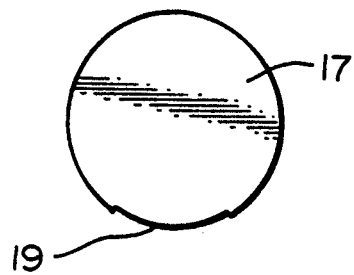
FIG. 5 is a view indicated by the arrow V in FIG. 4.
Figure 6:
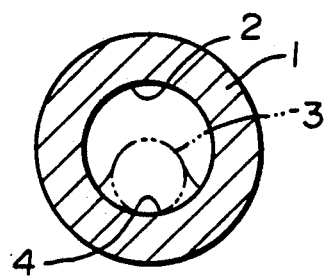
FIG. 6 is a cross section of a conventional sintered oil impregnated bearing.

Here, as shown in FIG. 4, a part of the external peripheral surface of the above noted core rod 17 is formed so that the surface roughness is higher than other parts thereof. This roughening section 19, having higher surface roughness, is formed so as to extend axially of the core rod 17 in a band shape, as well as somewhat in a depressed shape compared with the external peripheral surface of the core rod 17 (refer to FIG. 5). The width of the roughening section 19 in the circumferential direction is set to correspond with the width of the axially lying sliding face 13 of the inner peripheral surface of the bearing hole 12 of the sintered oil impregnated bearing to be manufactured, on which the rotating shaft 11 slides, and in practice, it is set to a width which includes the shrinkage of the powder compact due to sintering. Further, the above noted roughening section 19 is formed by electric discharge machining, and on its surface are formed a large number of fine protrusions. The surface roughness of the roughening section 19 is selected depending on the particle size of the powder to be compacted, but in this embodiment, it is set to 5-10 S (Japanese Industrial Standards; "S" corresponds to the maximum height ($\mu$m)).

Next, after the die 15 is filled with the powder, and by descending the upper punch 18 into the die 15, the powder is made into a cylindrical compressed form. In this case, because the core rod 17 is formed with a roughening section 19, the pores on the surface of the powder compact which are in contact with the roughening section 19 are crushed by the portions around the pores which are pressed to flow plastically into the pores by the large number of protrusions of the roughening section 19. Because the roughening section 19 is formed with a slight depression, that part of the formed powder compact which is in contact with the roughening section 19 and which is to become the sliding face 13, is slightly protruded.

After this, the powder compact thus formed is taken out of the die 15, and sintered at a prescribed temperature to obtain a sintered body. Because the pores on the surface to correspond with the sliding face 13 in the powder compact are crushed, the pores 13 on the sliding face in the sintered body are crushed.

The sintered body is assembled into a die set (not shown) similar to the above noted one, and by correcting the various parts of the sintered body by compression and sizing processing, the sintered oil impregnated bearing is produced. At the time of sizing processing, the slightly protruded sliding face 13 is pressed by the core rod of the die set, and becomes coplanar with the inner peripheral surface of the bearing hole 12, and the sliding face 13 is smoothed out.

Thus, according to the above noted sintered oil impregnated bearing, the pores on that axially lying sliding face 13 of the inner peripheral surface of the bearing hole 12 upon which face the rotating shaft 11 slides, are crushed, and further, because the crushing is performed during the forming of the powder compact of the main bearing body 10, the crushing of the pores is carried out reliably, and thereby preventing the leakage of the lubricating oil on the sliding face 13. Accordingly, a strong oil film which does not lead to lowering of the oil pressure is formed on the sliding face 13, and furthermore, to the sliding face 13 and the rotating shaft 11, sufficient lubricating oil is supplied from the pores on the inside surface, excepting the sliding face 13, of the bearing hole 12. Therefore, no local contact between the rotating shaft 11 and the sliding face 13 takes place, and it is possible to make the coefficient of friction of the sintered oil impregnated bearing small, and to obtain bearing characteristics having high application limits.

According to the manufacturing method for the above noted sintered oil impregnated bearing, since the roughening section 19 is formed on the core rod 17 of the die set, and at the time of effecting compression forming of the powder, the pores on the inside surface to become the sliding face 13 are crushed by this roughening section 19, the pores on the axially lying sliding face 13 of the inner peripheral surface of the bearing hole 12 upon which face the rotating shaft 11 slides, are crushed. Therefore, because the lubricating oil on the sliding face 13 does not leak, a strong film which does not lower the oil pressure is formed on the sliding face 13, and furthermore, on the sliding face 13 and on the rotating shaft 11, sufficient lubricating oil is supplied from the pores on the inside surface, excepting the sliding face 13, of the bearing hole 12. Therefore, local contact between the rotating shaft 11 and the sliding face 13 does not take place, thus it is possible to make the coefficient of friction small, thereby obtaining bearing characteristics having high application limits.

Further, there are advantages that, because the pores on the portion to become the sliding face 13 are crushed at the time of forming the powder compact, plastic deformation of the sliding face 13 is carried out smoothly, and their pores are crushed reliably, and there is no need to provide a new step of crushing the pores on the sliding face 13, and the same processing as before can be utilized to manufacture the sintered oil impregnated bearing.

Further, in the above noted embodiment, the electric discharge machining process was used to form the roughening section 19 of the core rod 17, but the process is not limited to it, and knurling or the like which is formed by a machining work may be used as the roughening section 19.

As explained above, according to the sintered oil impregnated bearing of this invention, because the pores, on that axially lying sliding face of the inner peripheral surface of the bearing hole upon which face the rotating shaft slides, are crushed during the forming of the powder compact, the bearing main body is easily plastically deformed, and the crushing of the pores is carried out reliably, and no leaking of the lubricating oil on the sliding face formed after sintering takes place. Therefore, a strong oil film having no oil pressure drop is formed on the sliding face, and sufficient lubricating oil is supplied to both the sliding face and the rotating shaft from the inside surface, excepting the sliding face 13, of the bearing hole. Therefore, local contact between the rotating shaft and the sliding face does not take place, and the coefficient of friction is made small, and it is possible to obtain bearing characteristics having high application limits.

According to the method of manufacturing the sintered oil impregnated bearing, by forming a through hole, which is to become the bearing hole, at the time of forming the powder compact prior to sintering, by means of a rod having on a part of its external peripheral surface a roughening section having higher surface roughness compared with other surface along the axial direction, the pores on the inside surface of the through hole which are in contact with the roughening section are crushed, and by sintering the powder compact afterward, the pores on that axially lying sliding face of the inner peripheral surface of the bearing hole in the manufactured sintered oil impregnated bearing upon which face the rotating shaft slides, are crushed. Therefore, no leaking of the lubricating oil on the sliding face takes place, and a strong oil film having no oil pressure drop is formed on the sliding face, and sufficient lubricating oil is supplied to both the sliding face and the rotating shaft from the inner peripheral surface of the bearing hole, excepting from the sliding face. Therefore, local contact between the rotating shaft and the sliding face does not take place, and the coefficient of friction is made small, and it is possible to obtain bearing characteristics having high application limits.

Further, because the pores on the surface to become the sliding face are crushed at the time of forming the powder compact, plastic deformation of the sliding face is carried out smoothly, and their pores are crushed reliably, and there is no need to provide a new step of crushing the pores on the sliding face, and the same processing as before can be utilized to manufacture the sintered oil impregnated bearing.

What is claimed is:

1. A sintered oil impregnated bearing comprising: a bearing main body made of a porous type sintered alloy, the bearing main body having a bearing hole formed therein for inserting a rotating shaft, wherein said rotating shaft slides on an axially lying sliding face of an inner peripheral surface of said bearing hole, and pores on said axially lying sliding face of the inner peripheral surface of said bearing hole are crushed at the time of powder compact forming of said bearing main body.

2. A method of manufacturing a sintered oil impregnated bearing in which a bearing hole through which a rotating shaft is inserted is formed in a bearing main body made of a porous type sintered alloy, the method comprising the steps of:

at the time of making a powder compact, forming a through-hole defining said bearing hole by means of a rod having on a part of an external peripheral surface a roughening section which has a surface roughness higher than other parts, thereby crushing pores on an inside surface of said through-hole held in contact with the roughening section, and thereafter sintering said powder compact.

* * * * *